US 8,671,278 B2

(12) United States Patent
Bas et al.

(10) Patent No.: US 8,671,278 B2
(45) Date of Patent: Mar. 11, 2014

(54) MULTIPROTOCOL COMMUNICATION AUTHENTICATION

(75) Inventors: Gilles Bas, Beauvoisin (FR); Hervé Chalopin, Aubagne (FR); François Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 42 days.

(21) Appl. No.: 13/189,808

(22) Filed: Jul. 25, 2011

(65) Prior Publication Data
US 2012/0030753 A1   Feb. 2, 2012

(30) Foreign Application Priority Data

Jul. 27, 2010   (FR) ...................................... 10 56152

(51) Int. Cl.
*H04L 9/00* (2006.01)
*G06F 13/00* (2006.01)

(52) U.S. Cl.
USPC .............. 713/168; 713/176; 726/16; 380/255

(58) Field of Classification Search
USPC ......... 713/168, 176; 726/3, 16; 380/255, 258, 380/259
See application file for complete search history.

(56) References Cited

U.S. PATENT DOCUMENTS

| | | | |
|---|---|---|---|
| 5,495,469 A | 2/1996 | Halter et al. | |
| 5,903,607 A | 5/1999 | Tailliet | |
| 6,874,052 B1 | 3/2005 | Delmonico | |
| 8,214,649 B2 * | 7/2012 | Wood | 713/182 |
| 8,285,990 B2 * | 10/2012 | Nakhjiri | 713/168 |
| 8,296,832 B2 * | 10/2012 | Atwood et al. | 726/7 |
| 8,437,473 B2 * | 5/2013 | Gantman et al. | 380/44 |
| 2004/0208200 A1 | 10/2004 | Hejdeman et al. | |
| 2006/0005033 A1 * | 1/2006 | Wood | 713/182 |
| 2006/0104396 A1 | 5/2006 | Soriano et al. | |
| 2006/0282675 A1 * | 12/2006 | Yao | 713/176 |
| 2007/0230614 A1 | 10/2007 | Walker et al. | |
| 2008/0229104 A1 * | 9/2008 | Ju et al. | 713/169 |
| 2009/0003597 A1 * | 1/2009 | Gantman et al. | 380/44 |
| 2010/0017553 A1 | 1/2010 | Laurencin et al. | |
| 2012/0030753 A1 * | 2/2012 | Bas et al. | 726/16 |

FOREIGN PATENT DOCUMENTS

WO   WO 2010010278 A1   1/2010

OTHER PUBLICATIONS

Message authentication code—Wikipedia, the free encyclopedia, printed out in year 2012.*
Multiple Signatures using Security Multiparts; draft-ietf-openpgp-multsig-02.txt ; D. Del Torto; Feb. 2001.*

(Continued)

*Primary Examiner* — Linglan Edwards
(74) *Attorney, Agent, or Firm* — Wolf, Greenfield & Sacks, P.C.

(57) ABSTRACT

A method for authenticating a transmission between a first and a second circuit transiting through at least one third circuit, wherein: data are transmitted from the first to the third circuit, and from the third to the second circuit; a first signature of the data is calculated by the first circuit; at least a second signature of the data is calculated by the third circuit; at least one first portion of the first signature is transmitted by the first circuit to the third one; and the second signature is transmitted by the third circuit to the second one, a portion of this signature being distorted in case of a failure of authentication of the first portion of the first signature by the third circuit.

30 Claims, 2 Drawing Sheets

(56) References Cited

OTHER PUBLICATIONS

Digital Signature and Multiple Signature: Different Cases for Different Purposes; Chafic Maroun Rouhana Moussa; GSEC Practical Assignment Version 1.4b; Jul. 7, 2003.*

French Search Report dated Feb. 24, 2011 from corresponding French Application No. 10/56152.

French Search Report dated Feb. 24, 2011 from related French Application No. 10/56149.

French Search Report dated Feb. 10, 2011 from related French Application No. 10/56148.

Menezes A.J. et al., Handbook of Applied Cryptography, Passage, Jan. 1, 1997, Handbook of Applied Cryptography; [CRC Press Series on Discrete Mathematics and its Applications], CRC Press, Boca Raton, Florida, pp. I-II, 352, XP002357451, pp. 352-368.

* cited by examiner

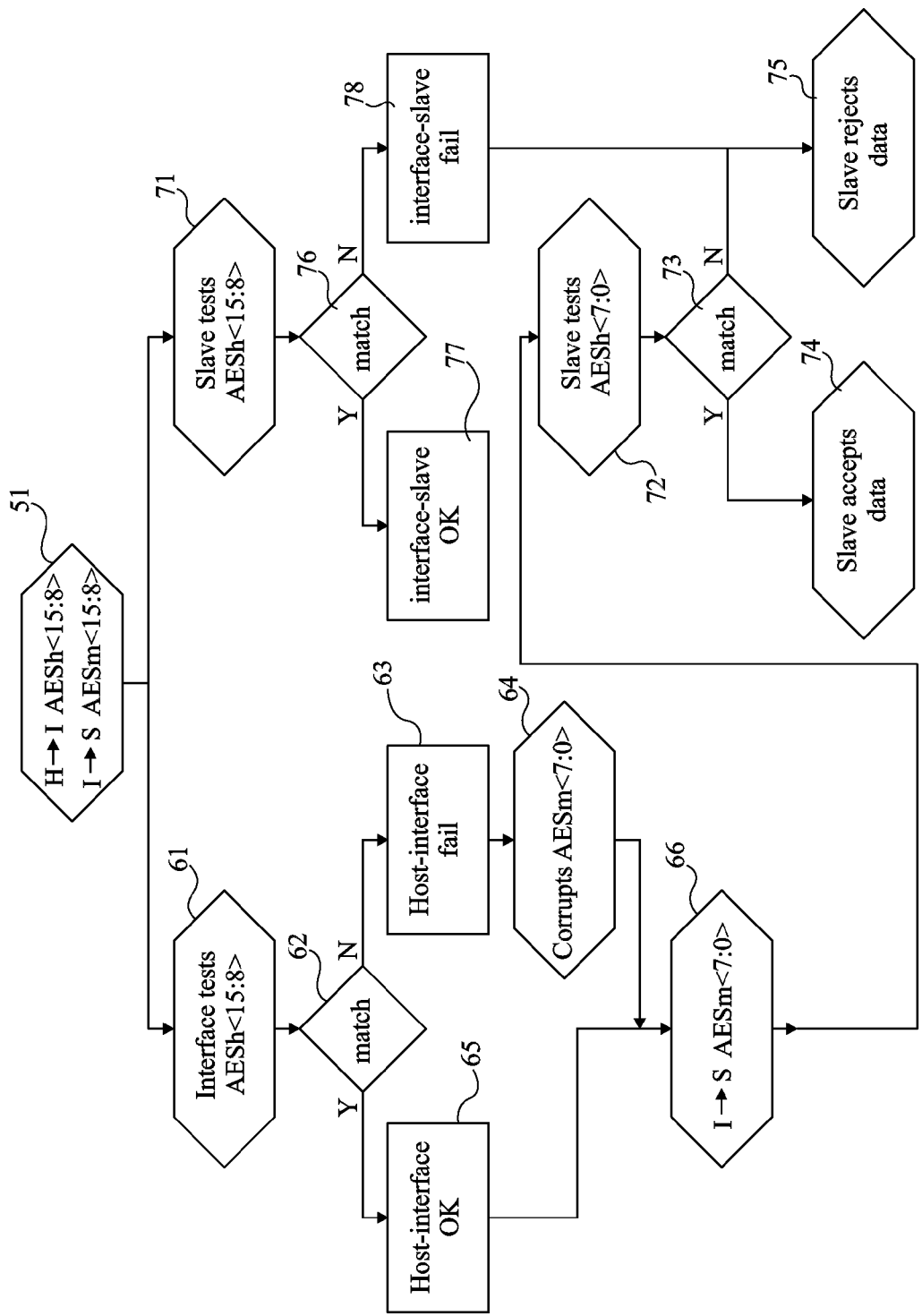

MULTIPROTOCOL COMMUNICATION AUTHENTICATION

CROSS REFERENCE TO RELATED APPLICATIONS

This application claims the priority benefit of French patent application number 10/56152, filed on Jul. 27, 2010, entitled MULTIPROTOCOL COMMUNICATION AUTHENTICATION, which is hereby incorporated by reference to the maximum extent allowable by law.

BACKGROUND OF THE INVENTION

1. Field of the Invention

The present invention generally relates to electronic circuits and, more specifically, to the transmission of digital data between two circuits via a conversion system. The present invention more specifically relates to the authentication of a transmission in the case where the two circuits do not use the same transmission protocol and use an interface or conversion circuit. The present invention more specifically applies to master-slave type transmission systems.

2. Discussion of the Related Art

Many systems of conversion or interface between communication buses adapted to different protocols are known.

For example, U.S. Pat. No. 6,066,964 describes a dynamic bus in which a communication can be established on one phase or the other of a clock signal.

According to another example, US patent applications 2010/017553 and EP 246287 describe a system of interface between a twin-wire bus and a single-wire bus exploiting the two half-periods of the clock signal of the twin-wire bus by placing the data on a first half-period and a wait pattern on the other half period.

Other mechanisms for converting a communication between circuits using different protocols, and thus an intermediary conversion circuit, are known.

In a master-slave transmission, it is often desirable for the slave circuit to be able to authenticate the master circuit and conversely, be it to indirectly protect the transmitted data or to authenticate the circuits or the data. Such mechanisms generally use symmetrical or asymmetrical cryptography algorithms.

The implementation of such mechanisms is generally not a problem when both circuits are connected on a same bus. However, in the presence of an interface or communication protocol conversion circuit involving an additional circuit, usual authentication mechanisms are not adapted.

In particular, in the case of a master-slave authentication, the converter may alter, transparently for the master and the slave, the content of the frames which transit through it, and thus distort the authentication data.

In other cases where the authentication relies on the converter-slave connection or on the master-converter connection, the system may be deceived by the substitution of a fake master or a fake slave.

SUMMARY OF THE INVENTION

Embodiments of the present invention especially applies to systems converting a multi-wire bus comprising at least one synchronization signal and one data signal into a single-wire bus and conversely.

An embodiment provides an authentication mechanism overcoming all or part of the disadvantages of usual mechanisms.

Another embodiment provides a mechanism adapted to a transmission involving a conversion circuit between the transmitter and the receiver.

Another embodiment provides a solution particularly well adapted to a conversion of an I2C-type twin-wire bus into a single-wire bus.

An embodiment provides a method for authenticating a transmission between a first and a second circuit transiting through at least one third circuit, wherein:

data are transmitted from the first to the third circuit, and from the third to the second circuit;

a first signature of the data is calculated by the first circuit;

at least one second signature of the data is calculated by the third circuit;

at least a first portion of the first signature is transmitted by the first circuit to the third one; and the second signature is transmitted by the third circuit to the second one, a portion of this signature being distorted in case of a failure of the authentication of the first portion of the first signature by the third circuit.

According to an embodiment, the second signature is transmitted in at least two portions.

According to an embodiment, the second signature is checked by portions by the second device.

According to an embodiment, the second portion of the first signature is not transmitted to the third device.

According to an embodiment:

the first and third circuits share a first key; and the second and third circuits share a second key different from the first one.

According to an embodiment, several third circuits are involved in the transmission, each third circuit sharing an authentication key with the previous and next circuits, and a second signature portion intended for the next circuit being distorted in the absence of authentication of the first signature portion originating from the previous device.

According to an embodiment, the signatures are calculated by an AES algorithm.

According to an embodiment, the transmission between the first and third circuits is performed over a bus comprising at least one data transmission wire and one synchronization signal transmission wire, the connection between the third and second circuits being a single-wire bus.

An embodiment also provides a system of transmission between a first and a second circuit via at least one third circuit.

An embodiment, the first circuit is a master circuit and the second circuit is a slave circuit, the third circuit being a communication protocol converter.

The foregoing and other objects, features, and advantages embodiments will be discussed in detail in the following non-limiting description of specific embodiments in connection with the accompanying drawings.

BRIEF DESCRIPTION OF THE DRAWINGS

FIG. 3 is a flowchart illustrating in more detail another embodiment of the authentication method.

DETAILED DESCRIPTION

Figure 1:
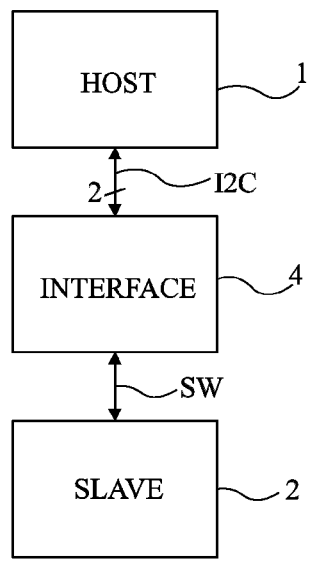
FIG. 1 shows in the form of blocks an example of architecture of a transmission system to which embodiments apply.

The same elements have been designated with the same reference numerals in the different drawings. For clarity, only those elements and steps which are useful to the understanding embodiments have been shown and will be described. In particular, the communication frame generation has not been detailed, embodiments being compatible with any usual communication protocol.

FIG. 1 is a block diagram of an embodiment of a system of communication between a master circuit 1 (HOST) capable of transmitting data according to a first protocol and a slave circuit 2 (SLAVE) capable of communicating according to another protocol. For example, the first protocol exploits an I2C-type twin-wire bus comprising a wire conveying a synchronization signal and a wire conveying a data signal, and the second protocol exploits a single-wire bus conveying both the synchronization signal and the data and, possibly, the power supply. An interface (INTERFACE) or conversion circuit 4 is interposed between the two buses to convert the transmission. The different circuits of the system may be powered independently from one another or over a power supply bus capable of conveying at least one power supply voltage and one reference voltage, for example, the ground.

To authenticate the circuits and the transmitted data, it is provided to use a symmetrical algorithm for calculating the signature of these data. Many such algorithms are known, for example, algorithms known as MAC or AES. These algorithms submit the data to be signed (the transmitted data) to an algorithm using a digital key and provide a signature. This signature is transmitted along with the data. The receiver owns the same digital key and the same algorithm, which enables it, according to the algorithm used, to calculate a signature from the received data and to compare it with the received signature, or to extract a copy of the data from the received signature to compare this copy with the received data. In the occurrence of a difference, this means either that the data have been modified, incidentally or willfully (pirating of the connection), during the transfer, or that the transmit or receive circuit is not the expected one.

It is provided to perform a signature control at the level of each section of the transmission (between the transmitter and the conversion circuit and between said circuit and the receiver).

It could be devised to validate, at the conversion circuit level, the data transmitted between the emitter and the conversion circuit, and to then forward these data to the receiver if they are valid and have their validity checked again by the receiver. However, such a sequential data validation would be incompatible with a real time transfer.

Further, for the case where the data are modified over the bus, it would be desirable for the receiver to warn the transmitter of a possible problem so that it can stop transmitting data.

Figure 2:
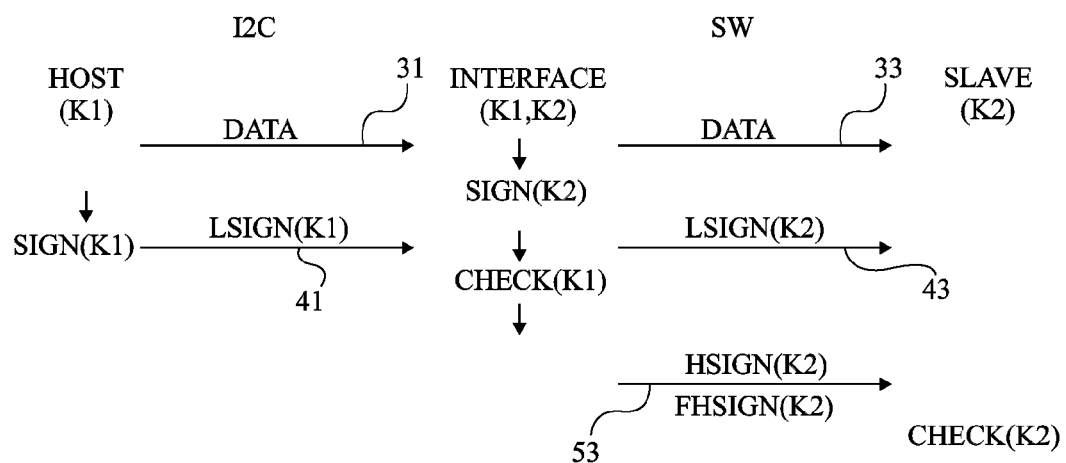
FIG. 2 illustrates an embodiment of the authentication method.

FIG. 2 shows an example of message exchange between circuits 1, 2, and 4 of FIG. 1, illustrating an embodiment of the provided authentication method.

According to this embodiment, the two connections from master circuit 1 to interface 4, and from interface 4 to slave circuit 2 are authenticated separately by providing a different authentication key for each connection (K1 for the I2C bus and K2 for the SW bus). However, the data transit through the interface without being delayed.

Data DATA are sent (arrow 31) by master circuit HOST to converter INTERFACE, and then (arrow 33) by the latter to slave circuit SLAVE. After sending 31, the master circuit calculates a signature SIGN(K1) of the data with key K1 that it shares with the interface. Then (arrow 41), its sends a portion only LSIGN(K1) of this signature (for example half of the bits) to the interface. In parallel (more specifically, without waiting for the reception of signature SIGN(K1), the interface calculates a second signature SIGN(K2) of the data that it has received from the master circuit. Then (arrow 43), its sends a first portion only LSIGN(K2) of this signature (for example half of the bits) to the slave circuit.

Such operations of signature calculation and of sending of a first portion thereof to the next circuit in the transmission direction are thus performed independently for each section, and thus with no delay. Further, the sending of data DATA between the interface and the slave circuit is not conditioned by the authentication between the master circuit and the interface.

On reception of portion LSIGN(K1) of the signature of the master circuit by the interface, said interface checks (CHECK (K1)) the consistency of this portion. For this purpose, it signs the received data with the key K1 that it owns and checks whether the first portion of this signature is in accordance with that received from the master circuit. The signature calculation with key K1 by the interface can even be performed before reception of portion LSIGN(K1).

According to the result of this checking, the interface circuit transmits (arrow 53) to the slave circuit either second portion HSIGN(K2) of the second signature, or a second corrupter portion FHSIGN(K2) of this second signature. This corrupted signature may be an arbitrary bit word, for example, originating from a random selection, a predefined word having a negligible chance of corresponding to an exact signature, the signature modified over at least one bit, etc.

The slave circuit then checks the second signature. For this purpose, it signs the received data with key K2 that it shares with the interface and checks (CHECK(K2)) that this signature is coherent with that received in two portions from the interface. In the occurrence of an inconsistency, the slave circuit takes countermeasures adapted to the application. For example, it does not process the received data, it does not respond to the master circuit, it resets, it deletes its key, etc.

According to an alternative embodiment, if the second signature is not properly checked by the slave circuit, said circuit sends a transmission error message to the master circuit. In most communication protocols, transmission error codes are provided. The sending of such a code by the slave circuit indicates to the master circuit that the communication is not reliable. If the error code can be differentiated from other error messages, the master circuit can take specific countermeasures, adapted to a piracy situation.

A survey of the portions of the second signature enables the slave circuit to determine the origin of the possible problem. If the first portion is not consistent, this means that the SW connection (or the slave circuit) is not authentic. If the second portion is not consistent, this means that the first I2C connection (or the master circuit) is not authentic. This may enable to take different countermeasures according to cases.

The two signatures use, for example but not necessarily, the same symmetrical algorithm.

FIG. 3 is a more detailed timing diagram of an embodiment of the signature checking method. In the example of FIG. 3, an AES algorithm is used to sign the data. Preferably, a signature length is selected according to the granularity of the transmitted data blocks. The AES algorithm here provides a signature over 16 bytes.

It is assumed that the data bits (for example, 16 bytes also) have already been transmitted from the master circuit to the interface circuit and from the interface circuit to the slave circuit.

In a first step (block 51, H→AESh<15:8>, I→S AESm<15:8>), master circuit H transmits to interface I eight first bytes AESh<15:8> of an AES over 16 bytes calculated based on the data that it has just transmitted to the interface.

This signature may be calculated at the time of the sending or be pre-calculated and stored by the master circuit. At this step 51, interface I calculates and transmits to slave circuit S the first eight bytes AESm<15:8> of an AES calculated on the data that it has received from the master circuit.

Interface circuit I checks (block 61, Interface tests AESh<15:8>) whether the first eight bytes of the received signature actually correspond to that calculated with the key that it shares with the master circuit. If the signature between the master circuit and the interface is not verified (output N of block 62, match), it is considered that the I2C connection (FIG. 1) is corrupt or that the master circuit is not authentic (block 63, Host-interface fail). The interface circuit corrupts (block 64, Corrupt AESm<7:0>) the next eight bytes AESm<7:0> of the second signature. However, if the interface validates the first byte of the signature (output Y of block 62) with the master, it is considered that the connection between the master circuit and the interface is correct (block 65, Host-interface OK). In both cases, the second signature portion (correct or distorted) is transmitted to the slave circuit (block 66 I→S AESm<7:0>).

On the slave circuit side, the first and second groups of eight bytes of the second signature may be processed independently. The slave circuit tests (block 71 Slave tests AESh<15:8>) the first eight bytes of the second signature based on the data that it has received from the interface. According to whether this first portion is or not correct (output Y or N of block 76, match), it is considered that the interface slave connection is correct (block 77, Interface-slave OK) or is incorrect (block 78, Interface-slave fail). In this last case, the slave circuit rejects the data (block 75, Slave rejects data) by adopting an adequate processing. Further, the slave circuit checks the next eight bytes (block 72, Slave tests AESh<7:0>). According to whether this calculated signature is correct or not (output Y or N of block 73, match), the slave circuit accepts the transmitted data (bloc 74, Slave accepts data) or rejects them (block 75).

As a variation, the second signature is integrally transmitted (with its second portion, distorted or not) to the slave circuit to be checked.

What has just been described for the authentication of master-interface and interface-slave connections also applies in the other direction. The master just has to be considered as the slave, and conversely.

The described embodiments take advantage from the fact that the aim here is to authenticate the communication and not to protect the transmitted data. Accordingly, the data can be sent independently from the signature checking, which is only used to validate them. The authentication may besides be combined with an encryption of the transmitted data, provided for the signatures to be calculated based on the encrypted data. The interface then does not need to know the encryption key.

The fact of systematically transmitting the data prevents a fraudulent user having pirated one of the connections from knowing which circuit has detected the error.

In the above-described embodiments, the second portion of the first signature between the master circuit and the interface is never transmitted to the interface. However, the risk for two first signature portions to be identical with different data may in most cases be neglected, especially with a relatively large signature (of the same order of magnitude as the data).

Various embodiments have been described, different alterations and modifications will occur to those skilled in the art. In particular, although embodiments have been described in relation with a transmission between two circuits via an interface, embodiments more generally apply to a cascade transmission via several intermediary circuits, provided for at least one of these circuits to perform a protocol conversion. In such a case, the intermediary circuit which detects a possible error corrupts the signature of the rest of the message.

Further, the practical implementation of embodiments is within the abilities of those skilled in the art based on the functional indications given hereabove and using usual hardware and software.

Further, although embodiments have been described in relation with an example of master slave communication over I2C and SW buses, it more generally applies to any transmission between a transmitter and a receiver involving a communication protocol conversion.

Finally, although embodiments have been more specifically described in relation with the use of an AES-type algorithm, it more generally applies to any signature or authentication message calculation algorithm.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for authenticating a transmission between a first circuit and a second circuit transiting through at least one third circuit, the method comprising:
   transmitting data from the first circuit to the at least one third circuit, and from the at least one third circuit to the second circuit;
   calculating a first signature of the data by the first circuit using a first key shared between the first circuit and the at least one third circuit;
   independently of receiving the first signature by the at least one third circuit, calculating at least one second signature of the data by the at least one third circuit using a second key different from the first key, wherein the second key being shared between the at least one third circuit and the second circuit;
   transmitting a first portion of the first signature by the first circuit to the at least one third circuit;
   transmitting a first portion of the at least one second signature by the at least one third circuit to the second circuit; and
   in response to the first circuit calculating and transmitting the first portion of the first signature to the at least one third circuit and the at least one third circuit transmitting the first portion of the at least one second signature to the second circuit, authenticating the first portion of the first signature by the at least one third circuit;
   when the authentication of the first portion of the first signature by the at least one third circuit succeeds, transmitting, by the at least one third circuit, a second portion of the at least one second signature to the second circuit; and
   when the authentication of the first portion of the first signature by the at least one third circuit fails, transmitting, by the at least one third circuit, a modified second portion of the at least one second signature to the slave second circuit.

2. The method of claim 1, comprising transmitting the at least one second signature in at least two portions of the at least one second signature.

3. The method of claim 1, comprising checking the at least one second signature by portions by the second circuit.

4. The method of claim 3, further comprising:
  determining whether a connection between the first circuit and the at least one third circuit or a connection between the at least one third circuit and the second circuit is not authentic based on checking the at least one second signature by the portions.

5. The method of claim 1, wherein the second portion of the first signature is not transmitted to the at least one third circuit.

6. The method of claim 1, wherein:
  the at least one third circuit comprises a plurality of third circuits;
  each third circuit of the plurality of third circuits is configured to share an authentication key with a previous circuit and a next circuit of the plurality of third circuits; and
  a second portion of a signature intended for the next circuit is distorted in the absence of authentication of a first portion of a signature originating from the previous circuit.

7. The method of claim 1, wherein the first signature and the at least one second signature are calculated by an AES algorithm.

8. The method of claim 1, wherein:
  the transmission between the first circuit and the at least one third circuit is performed over a bus comprising at least one data transmission wire and one synchronization signal transmission wire; and
  the at least one third circuit and second circuit are coupled through a single-wire bus.

9. A system of transmission between a first and a second circuit via at least one third circuit, wherein the circuits are configured to implement the method of claim 1.

10. The system of claim 9, wherein the first circuit is a master circuit and the second circuit is a slave circuit, the at least one third circuit being a communication protocol converter.

11. The method of claim 1, further comprising:
  verifying, by the second circuit, the at least one second signature.

12. The method of claim 11, further comprising:
  when the at least one second signature is not verified, taking, by the second circuit, a countermeasure with respect to the data.

13. The method of claim 11, further comprising:
  when the at least one second signature is not verified, transmitting, by the second circuit, a transmission error message to the first circuit.

14. The method of claim 1, further comprising:
  transmitting, by the at least one third circuit, the first portion of the at least one second signature simultaneously with transmitting, by the at least one third circuit, the second portion of the at least one second signature or the modified second portion of the at least one second signature.

15. A system for authenticating a transmission of data between a master circuit and a slave circuit via at least one interface circuit, the system comprising:
  the master circuit configured to:
    transmit the data to the at least one interface circuit;
    calculate a first signature of the data using a first key, the first key being shared between the master circuit and the at least one interface circuit; and
    transmit a first portion of the first signature to the at least one interface circuit;
  the at least one interface circuit configured to:
    transmit the data to the slave circuit;
    independently of receiving the first signature, calculate at least one second signature of the data using a second key, the second key being shared between the at least one interface circuit and the slave circuit; and
    transmit the at least one second signature to the slave circuit by:
      transmitting a first portion of the at least one second signature to the slave circuit;
      in response to the master circuit calculating and transmitting the first portion of the first signature to the at least one interface circuit and the at least one interface circuit transmitting the first portion of the at least one second signature to the slave circuit, authenticating the first portion of the first signature;
      when the authentication of the first portion of the first signature by the at least one interface circuit succeeds, transmitting a second portion of the at least one second signature to the slave circuit; and
      when the authentication of the first portion of the first signature by the at least one interface circuit fails, transmitting a modified second portion of the at least one second signature to the slave circuit; and
  the slave circuit configured to:
    verify the at least one second signature received from the at least one interface circuit.

16. The system of claim 15, wherein:
  the at least one interface circuit comprises a plurality of interface circuits; each interface circuit of the plurality of interface circuits is configured to share an authentication key with a previous circuit and a next circuit of the plurality of interface circuits; and
  a second portion of a signature intended for the next circuit is distorted when a first portion of a signature originating from the previous circuit is not authenticated.

17. The system of claim 15, wherein:
  the master circuit and the at least one interface circuit are configured to communicate via a first communication protocol; and
  the at least one interface circuit and the slave circuit are configured to communicate via a second communication protocol that is different from the first communication protocol.

18. The system of claim 17, wherein:
  the first communication protocol is implemented over a bus comprising at least one data transmission wire and one synchronization signal transmission wire; and
  the second communication protocol is implemented over a single-wire bus.

19. The system of claim 15, wherein:
  the at least one interface circuit comprises a communication protocol converter.

20. The system of claim 15, wherein:
  the slave circuit is configured to, when the at least one second signature is not verified, take a countermeasure with respect to the data.

21. The system of claim 15, wherein:
  the slave circuit is configured to, when the at least one second signature is not verified, transmit a transmission error message to the master circuit.

22. The system of claim 15, wherein:
  the slave circuit is configured to determine whether a connection between the master circuit and the at least one interface circuit or a connection between the at least one interface circuit and the slave circuit is not authentic based on checking the at least one second signature by portions.

23. A device for converting communications between a first circuit using a first communication protocol and a second circuit using a second communication protocol, the device comprising a memory and at least one processor configured to:
   receive data from the first circuit and transmit the data to the second circuit;
   receive, from the first circuit, a first portion of a first signature of the data calculated by the first circuit, the first signature being calculated using a first key shared between the first circuit and the device;
   independently of receiving the first signature, calculate at least one second signature of the data using a second key shared between the device and the second circuit;
   transmit a first portion of the at least one second signature to the second circuit;
   perform an authentication of the first portion of the first signature; and
   in response to the first circuit calculating and transmitting the first portion of the first signature to the at least one third circuit and the at least one third circuit transmitting the first portion of the at least one second signature to the second circuit:
      when the authentication of the first portion of the first signature succeeds, transmit a second portion of the at least one second signature to the second circuit; and
      when the authentication of the first portion of the first signature fails, transmit a modified second portion of the at least one second signature to the second.

24. The device of claim 23, wherein the at least one processor is configured to perform the authentication of the first portion of the first signature by:
   generating a third signature using the data and the first key that the device shares with the first circuit; and
   comparing a first portion of the third signature and the first portion of the first signature received from the first circuit.

25. The device of claim 23, wherein the at least one processor is configured to calculate the at least one second signature independently of the reception of the first portion of the first signature.

26. The device of claim 23, wherein the device is configured to:
   communicate with the first circuit via the first communication protocol; and
   communicate with the second circuit via the second communication protocol.

27. The device of claim 23, wherein the at least one processor does not receive a second portion of the first signature from the first circuit, the second portion of the first signature being different from the first portion of the first signature.

28. The device of claim 23, wherein:
   the device comprises a plurality of interface circuits;
   each interface circuit of the plurality of interface circuits is configured to share an authentication key with a previous circuit and a next circuit of the plurality of interface circuits; and
   a second portion of a signature intended for the next circuit is distorted when a first portion of a signature originating from the previous circuit is not authenticated.

29. A method for authenticating a transmission of data transmitted between a first circuit and a second circuit via at least one interface circuit, the method comprising:
   transmitting the data from the first circuit to the at least one interface circuit, and from the at least one interface circuit to the second circuit, wherein:
   the first circuit and the at least one interface circuit are configured to communicate via a first communication protocol; and
   the at least one interface circuit and the second circuit are configured to communicate via a second communication protocol that is different from the first communication protocol;
   calculating a first signature of the data by the first circuit using a first key shared by the first circuit and the at least one interface circuit;
   independently of receiving the first signature, calculating at least one second signature of the data by the at least one interface circuit using a second key, the second key being shared between the at least one interface circuit and the second circuit;
   transmitting only a first portion of the first signature by the first circuit to the at least one interface circuit;
   transmitting a first portion of the at least one second signature by the at least one third circuit to the second circuit;
   transmitting, by the at least one third circuit, a second portion of the at least one second signature to the second circuit based on a result of an authentication of the first portion of the first signature by the at least one third circuit by:
   in response to the first circuit calculating and transmitting the first portion of the first signature to the at least one third circuit and the at least one third circuit transmitting the first portion of the at least one second signature to the second circuit, authenticating the first portion of the first signature;
      when the authentication of the first portion of the first signature succeeds, transmitting a correct second portion of the at least one second signature; and
      when the authentication of the first portion of the first signature fails, transmitting a corrupted second portion of the at least one second signature.

30. The method of claim 29, further comprising:
   verifying, by the second circuit, the first portion and the second portion of the at least one second signature.

* * * * *